United States Patent [19]

Shald

[11] 4,232,806
[45] Nov. 11, 1980

[54] WATER SKI RACK

[76] Inventor: Roland L. Shald, 3137 S. 116th Ave., Omaha, Nebr. 68144

[21] Appl. No.: 879,982

[22] Filed: Feb. 22, 1978

[51] Int. Cl.² .............................................. B60R 9/12
[52] U.S. Cl. ................................ 224/42.44; 224/321; 224/42.07; 211/60 SK; 280/814
[58] Field of Search ................. 224/42.45 R, 42.46 R, 224/29 R, 42.03 R, 42.03 B, 42.43, 42.44, 42.1 F; 9/1.6, 1.7, 310 A, 310 R; 211/60 SK, 41, 60 S, 86, 184; 280/11.37 K, 11.37 A

[56] References Cited

U.S. PATENT DOCUMENTS

| | | | |
|---|---|---|---|
| 3,527,354 | 9/1970 | Sokolow | 211/60 SK |
| 3,701,436 | 10/1972 | Adams | 224/42.45 R X |
| 3,776,437 | 12/1973 | Carney | 224/42.45 R |
| 3,805,722 | 4/1974 | Melchert, Jr. et al. | 9/1.6 X |
| 3,925,836 | 12/1975 | Simmonds | 9/1.7 |

FOREIGN PATENT DOCUMENTS 558732 2/1975 Switzerland ..................... 224/42.1 F Primary Examiner—Robert J. Spar
Assistant Examiner—Jerold M. Forsberg
Attorney, Agent, or Firm—Henderson & Sturm

[57] ABSTRACT

A water ski rack for attachment to a boat is disclosed. The rack provides at least two spaced frame units with mounting brackets, and a plurality of obliquely slanted upwardly projecting ski holding elements slidably mounted upon the frame units, and adapted to support the skis. The slidable ski holding elements include a removable protective sheath and are adjustable along the length of the frame unit to accommodate a variety of skis. The frame units and mounting brackets are adjustable to allow attachment to different boats.

5 Claims, 9 Drawing Figures

WATER SKI RACK

BACKGROUND OF THE INVENTION

I. Field of the Invention

The present invention relates in general to a water ski rack adapted to connection to a boat to support one or more water skis.

II. Description of the Prior Art

As the popularity of water skiing has increased, so have the variations in ski type and design. As a result of these design changes, it is often desirable to have more than one pair of water skis easily accessible while engaged in the sport. In addition, as it is a common practice to tow more than one skier at a time, it becomes necessary to carry several pairs of skis to accomodate numerous skiers.

As the stowage area on small boats is extremely limited, the on-board carrying of multiple water skis presents a space problem. Also, loose water skis lying about on the boat floor subject passengers to danger, and water skis so placed may become damaged or broken.

Consequently, there exists a need for a water ski rack which can be placed on the outer portion of the boat which will support multiple skis and yet allow easy access for their use. In addition, such a water ski rack should be easily adapted to attachment to a wide variety of boats and receptive of a wide variety of water ski designs. The present invention is directed to that need.

SUMMARY OF THE INVENTION

The present invention relates to a water ski rack for attachment to a boat to support one or more water skis and yet allow easy access for their use. It is therefore an object of this invention to provide a water ski rack which will store at least one water ski.

It is another object of this invention to provide a water ski rack which will support one or more water skis and is easily accessible from both inside and outside of the boat to which it is attached.

Another object of this invention is to provide a water ski rack which will support several water skis.

It is another object of this invention to provide a water ski rack which will safely support one or more water skis to prevent their becoming damaged or broken.

It is another object of this invention to provide a water ski rack for attachment to a boat which provides at least two spaced frame units with boat mounting brackets and a plurality of obliquely slanted upwardly projecting ski holding elements slidably mounted upon the frame units and adapted to support the skis.

It is another object of the invention to provide a water ski rack which is adjustable to fit various designs and types of water skis.

It is another object of this invention to provide a water ski rack in which the integral parts are interchangeable to accomodate adaptation to numerous boat designs and types.

It is another object of this invention to provide a water ski rack for which damaged broken or bent components may be easily and inexpensively replaced.

A still further object of the invention is to provide a water ski rack which is simple, compact, inexpensive to maintain contains few moving parts, is durable in use, is easy to manufacture, and is extremely reliable.

Other objects, advantages and novel features of the present invention will become apparent from the following detailed description of the invention when considered in conjunction with the accompanying drawings.

BRIEF DESCRIPTION OF THE DRAWINGS

For a better understanding of the invention, as well as other objects and further features thereof, reference is made to the following detailed disclosure of the invention, taken in conjunction with the accompanying drawings wherein.

DESCRIPTION OF THE PREFERRED EMBODIMENTS

Figure 1:
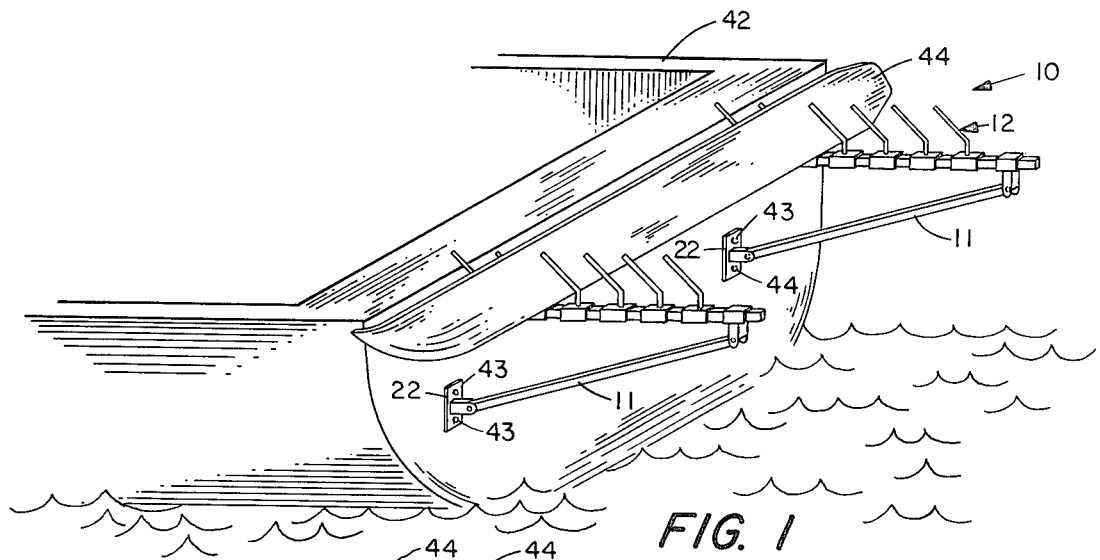
FIG. 1 is a perspective view of the stern portion of a boat with the water ski rack attached and a water ski placed thereon.

Referring now to the drawings, and in particular to FIG. 1, the apparatus may be seen as generally depicted by the numeral 10. In particular, the apparatus includes at least two spaced apart frame units 11 and a plurality of ski holding elements 12 attached thereto.

Figure 3:
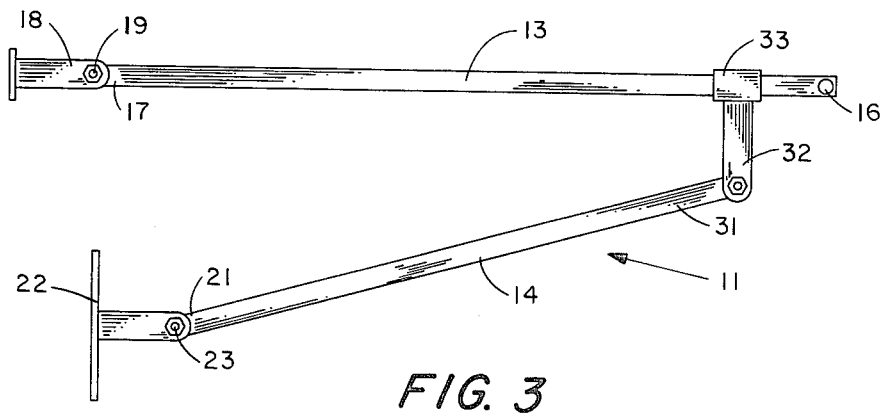
FIG. 3 is a side elevational view of one of the frame units of the water ski rack.

Since each frame unit 11 is identical to every other frame unit 11, only one frame unit will be described in detail with like numerals referring to the like part throughout. In FIG. 3, the frame unit 11 is formed primarily of a holding element support bar 13 and a brace bar 14, the brace bar 14 being of lesser length than the holding element support bar 13. Both bars 13 and 14 includes holes 16 disposed therethrough proximate each end thereof. The first end 17 of the holding element support bar 13 is pivotally attached to a horizontal mounting bracket 18 by a pin 19 or other suitable agent, such as a bolt or journal; the pin 19 being disposed through the aforementioned hole 16. Likewise, the first end 21 of the brace bar 14 is pivotally attached to a vertical mounting bracket 22 by a pin 23 or the like.

Figure 8:
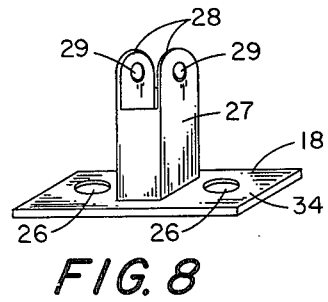
FIG. 8 is a perspective view of the horizontal mounting bracket.
Figure 9:
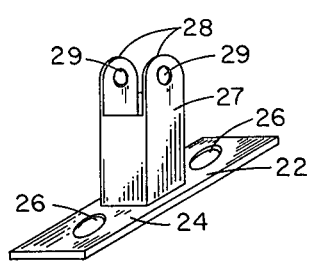
FIG. 9 is a perspective view of the vertical mounting bracket.

With momentary reference to FIGS. 8 and 9, the mounting brackets 18 and 22 each include a mounting plate 24 having two holes 26 disposed therethrough, and a mounting post 27 attached between the holes 26. The mounting post 27 includes a pair of flanges 28 having matched holes 29 symetrically disposed therethrough. In the case of the horizontal mounting bracket 18, the flanges 28 are disposed lateral to the mounting plate 24, and with respect to the vertical mounting bracket 22, the flanges 28 are disposed longitudinal to the mounting plate 24.

To assemble the frame unit 11 as described above, the bars 13 and 14 are oriented between the flanges 28 such that the three holes 16 and 29 involved are aligned and a pin 19 or 23 disposed therethrough.

Returning to FIG. 3, the second end 31 of the brace bar 14 distal the vertical mounting bracket 22 is pivotally attached to a sliding junction or support bracket 32. The means of pivotal attachment is identical to that described with respect to the mounting brackets 18 and 22, and therefore need not be repeated here. The unattached end of the junction or support bracket 32 includes a sleeve 33. The sleeve 33 has a structure for selectively securing said junction or support bracket 32 to said support bar 13 and is of an interior dimension such that the holding element support bar 13 may be slidably inserted therethrough.

It is appropriate to note at this point that the foregoing construction is not of a mandatory nature. The holding element support bar 13 is interchangeable with the position of the brace bar 14 and vice-versa. Furthermore, the horizontal mounting bracket 22 may be juxtaposed with the vertical mounting bracket 18. Such reorientations may be appropriate or necessary, given the great variety of surface configurations to which the frame unit 11 may be attached.

Figure 4:
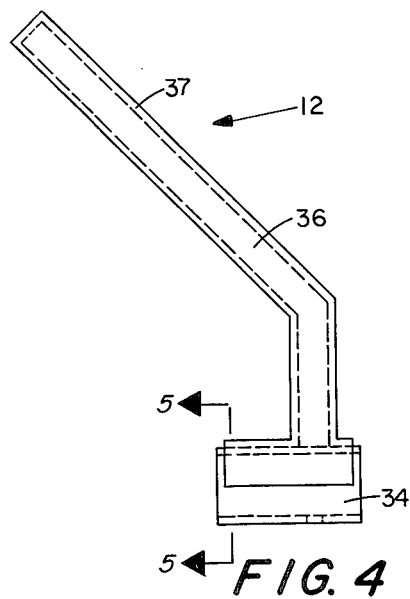
FIG. 4 is a side elevational view of one of the ski holding elements.
Figure 5:
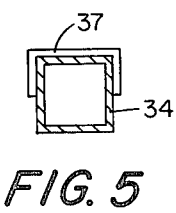
FIG. 5 is a cross sectional view of the slidable base portion of the ski of one of the ski support elements taking substantially at line 5—5.

With reference to FIG. 4, the ski holding elements 12 will now be described. Since each ski holding element 12 is identical to every other ski holding element 12, only one will be described in detail, with like numerals referring to like elements throughout. The ski holding element 12 is formed of a slidable base 34 and a rod-like holding element 36. As shown in FIG. 5, the slidable base 34 is formed in the shape of a rectangular tube, the interior diameter of which is complimentary to the exterior diameter of the holding element support bar 13. The holding element 36 is formed by a bent rod affixed normally to the upper surface of the slidable base 34. The oblique angular nature of the holding element 36 is provided for enhanced operation.

The rod like holding element 36 projects normally upwardly from the slidable base 34 at a point other than at the midpoint of the slidable base 34. The reason for the offset construction of the holding element 36 is to accomodate the resting of a water ski upon the top surface of the slidable base 34.

The holding element is obliquely slanted to better facilitate the friction holding of the water skis and to allow the placement of the water skis on the rack and their removal at an angle for greater ease of operation. To protect and hold the skis, a protective sheath 37 is disposed about the holding element 36 and the offset portion of the slidable base 34. Any suitable rubber or plastic material may be utilized for this purpose. In this embodiment, the sheath 37 is of a removable nature, such that the sheath 37 may be easily replaced should damage occur. The protective sheath 37 may however, be applied as a film and thereby not be removable.

Figure 6:
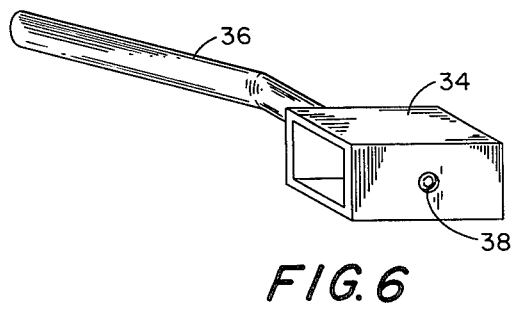
FIG. 6 is a perspective view of one of the ski holding elements in which the protective cushioning sheath has been removed.
Figure 7:
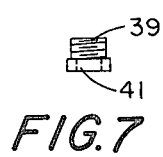
FIG. 7 is a side elevational view of the lock screw which is inserted in the base of the ski holding element.

A tapped hole 38 (FIG. 6) is disposed through the bottom of the slidable base 34 directly opposite the holding element 36. A lock screw (FIG. 7) having a recessed key 41 is provided for insertion therein.

Figure 2:
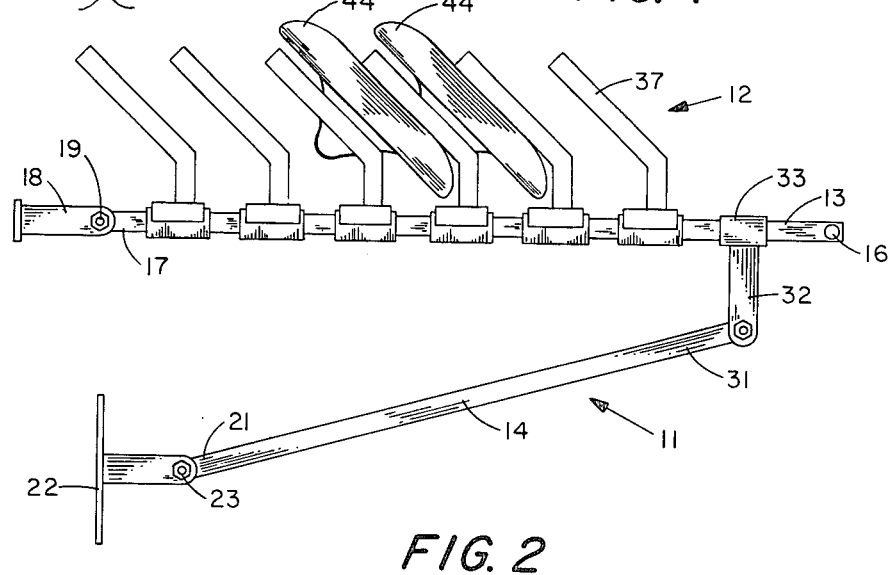
FIG. 2 is a side elevational view of one of the rack units wherein two water skis have been placed.

Use of the apparatus may now be disclosed. As shown in FIG. 2, a plurality of ski holding elements 12 are slidably disposed along the holding element support bar 13. The frame units 11 may be attached to any appropriate surface, in this case a boat 42 as illustrated in FIG. 1. The frame units 11 may be mounted by inserting screws 43 or the like through the holes 26 provided in the mounting brackets 18 and 22. The orientation of the various elements of the frame units 11 may be altered until the holding element support bar 13 is maintained substantially horizontal. The ski holding elements 12 may be spaced according to the size of the skis 44 to be held, and then locked in place by tightening the lock screw 39 provided in the slidable base 34. If different sized skis 44 are later to be accomodated, or the operator wishes to remove excess ski holding elements 12, the lock screw 39 may be untightened, and the corresponding ski holding element 12 moved or removed.

It should be remembered that only a preferred embodiment has been disclosed herein. Many variations will occur to those skilled in the art, and these variations are not to be considered as without the scope of the claims herein appended.

I claim:

1. A water ski rack comprising:
   (a) a plurality of spaced apart frame units adapted for connection to a boat comprised of at least one elongated support bar having a first end and a second end and at least one brace bar having a first end and a second end wherein the second end of the support bar is pivotally attached to a support bracket which is slidably adjustable along the length of the brace bar and a first boat mounting bracket is pivotally attached to the first end of the support bar and a second boat mounting bracket is pivotally attached to the first end of the brace bar;
   (b) a plurality of upwardly projecting ski holding elements with obliquely and inwardly slanted end projections on their upper portions affixed to the frame units and adapted to support at least one water ski wherein the ski holding elements are slidably adjustable along the frame units;
   (c) securing means for selectively securing the ski holding elements along the length of the support bar; and
   (d) securing means to selectively secure said support bracket to said support bar, whereby the angle of orientation of the support bar may be varied relative to the boat mounting brackets to maintain the support bar in a substantially horizontal position.

2. The water ski rack as described in claim 1 further comprising a protective sheath covering the ski holding elements and attached thereto.

3. The water ski rack as described in claim 2 wherein the protective sheath is removable from the ski holding elements.

4. The water ski rack as described in claim 3 wherein the first mounting bracket includes a mounting plate having attachment holes therein and a mounting post affixed normal to said mounting plate; said mounting post having pivotal attachment flanges disposed distal the mounting plate, said flanges having holes therethrough, said flange holes having extended centers coplanar to the extended centers of said holes in said mounting plate.

5. The water ski rack as described in claim 3 wherein the second mounting bracket includes a mounting plate having attachment holes therein and a mounting post affixed normal to said mounting plate; said mounting post having pivotal attachment flanges disposed distal the mounting plate; said flanges having holes therethrough; said flange holes having extended centers perpendicular to the plane of the extended centers of said holes in said mounting plate.

* * * * *